United States Patent
Omi et al.

(10) Patent No.: US 10,092,472 B2
(45) Date of Patent: Oct. 9, 2018

(54) NURSE CALL SYSTEM, INTERFACE UNIT, AND NURSE CALL CONNECTION METHOD

(71) Applicants: NEC Platforms, Ltd., Kawasaki-shi, Kanagawa (JP); NIPPON TELEGRAPH AND TELEPHONE EAST CORPORATION, Tokyo (JP); NIPPON TELEGRAPH AND TELEPHONE WEST CORPORATION, Osaka-shi, Osaka (JP)

(72) Inventors: Takuya Omi, Kanagawa (JP); Shigeru Maruyama, Kanagawa (JP); Kou Nogami, Tokyo (JP); Rintarou Ashida, Tokyo (JP); Ken Utsuki, Tokyo (JP); Norio Murakami, Osaka (JP)

(73) Assignees: NEC Platforms, Ltd., Kawasaki-shi, Kanagawa (JP); NIPPON TELEGRAPH AND TELEPHONE EAST CORPORATION, Shinjuku-ku, Tokyo (JP); NIPPON TELEGRAPH AND TELEPHONE WEST CORPORATION, Osaka-shi, Osaka (JP)

( * ) Notice: Subject to any disclaimer, the term of this patent is extended or adjusted under 35 U.S.C. 154(b) by 0 days.

(21) Appl. No.: 15/322,925

(22) PCT Filed: Oct. 22, 2015

(86) PCT No.: PCT/JP2015/079853
§ 371 (c)(1),
(2) Date: Dec. 29, 2016

(87) PCT Pub. No.: WO2016/072282
PCT Pub. Date: May 12, 2016

(65) Prior Publication Data
US 2017/0135889 A1    May 18, 2017

(30) Foreign Application Priority Data

Nov. 7, 2014    (JP) .................................. 2014-226788

(51) Int. Cl.
*G08B 5/22* (2006.01)
*A61G 12/00* (2006.01)
(Continued)

(52) U.S. Cl.
CPC .............. *A61G 12/00* (2013.01); *H04M 9/00* (2013.01); *H04Q 3/62* (2013.01)

(58) Field of Classification Search
CPC ................................. H04Q 3/62; A61G 12/00
(Continued)

(56) References Cited

U.S. PATENT DOCUMENTS 4,985,891 A * 1/1991 Fujiwara ............ H04Q 11/0428
370/524
5,430,708 A * 7/1995 Fukuda .................... H04J 3/12
370/241
(Continued)

FOREIGN PATENT DOCUMENTS

| CN | 101568926 A | 10/2009 |
| JP | 5-83247 A | 4/1993 |

(Continued)

OTHER PUBLICATIONS

Guideline regarding connection between nurse call and housing complex intercom and PBX, Sep. 25, 2002, 31 pp.
(Continued)

*Primary Examiner* — Zhen Y Wu
(74) *Attorney, Agent, or Firm* — Sughrue Mion, PLLC

(57) ABSTRACT

In nurse call systems where communication between a plurality of slave units and a plurality of extension terminals is possible, a nurse call controller serving the slave units and
(Continued)

US 10,092,472 B2

Page 2 a private branch exchange serving the mobile terminals have been connected to each other through a nurse call adaptor; thus, there is a need for one such nurse call system that does not require a nurse call adaptor. Provided is an interface unit which is connected to a nurse call controller through a plurality of ISND basic interfaces, connected to a private branch exchange through an ISDN primary rate interface, and performs interface conversion therebetween.

4 Claims, 7 Drawing Sheets

(51) Int. Cl.
*H04M 9/00* (2006.01)
*H04Q 3/62* (2006.01)

(58) Field of Classification Search
USPC ...................................... 340/286.07; 370/264
See application file for complete search history.

(56) References Cited

U.S. PATENT DOCUMENTS

| | | | | |
|---|---|---|---|---|
| 5,467,353 A | * | 11/1995 | Fukuda | H04J 3/0629 370/524 |
| 5,509,053 A | * | 4/1996 | Gowda | H04W 76/10 455/465 |
| 6,912,273 B2 | * | 6/2005 | Geck | H04M 3/42314 370/251 |
| 2001/0007555 A1 | * | 7/2001 | Sasagawa | H04L 29/06027 370/359 |
| 2002/0044043 A1 | * | 4/2002 | Chaco | G06F 19/3418 340/286.07 |
| 2003/0007492 A1 | * | 1/2003 | Christie | H04L 29/06 370/395.2 |
| 2017/0135889 A1 | * | 5/2017 | Omi | A61G 12/00 |

FOREIGN PATENT DOCUMENTS

| | | | | |
|---|---|---|---|---|
| JP | 2001-16626 A | | 1/2001 | |
| JP | 2005-269227 | * | 9/2005 | ............. H04M 9/00 |
| JP | 2005-269227 A | | 9/2005 | |
| JP | 2008-205946 A | | 9/2008 | |
| JP | 2010-057083 A | | 3/2010 | |
| JP | 2010-162151 A | | 7/2010 | |

OTHER PUBLICATIONS

International Search Report of PCT/JP2015/079853, dated Dec. 28, 2015 (PCT/ISA/210).
Communication dated Oct. 9, 2017 by the Chinese Patent Office in a counterpart Chinese Patent Application No. 201580036012.2.
Communication dated Oct. 19, 2017 by the European Patent Office in a counterpart European Patent Application No. 15857575.3.

* cited by examiner

| for ISDN Basic Interface | | for ISDN Primary Rate Interface |
|---|---|---|
| Circuit 1 | Channel 1 | Channel 1 |
| | Channel 2 | Channel 2 |
| Circuit 2 | Channel 1 | Channel 3 |
| | Channel 2 | Channel 4 |

Fig.3

NURSE CALL SYSTEM, INTERFACE UNIT, AND NURSE CALL CONNECTION METHOD

CROSS REFERENCE TO RELATED APPLICATIONS

This is a U.S. national stage of application No. PCT/JP2015/079853, filed on Oct. 22, 2015. Priority under 35 U.S.C. § 119(a) and 35 U.S.C.§ 365(b) is claimed from Japanese Patent Applications No. 2014-226788 filed on Nov. 7, 2014, the disclosure of which is incorporated herein by reference.

TECHNICAL FIELD

The present invention relates to a nurse call system, an interface unit, and a nurse call connection method.

BACKGROUND ART

In hospitals, care facilities, and the like, a nurse call system that enables a patient and a nurse (a person to be cared and a caregiver in the care facilities, and the like) to talk is installed. Such a nurse call system is a system in which a nurse call device and a private branch exchange (PBX or key telephone main device) are operated in cooperation with each other, and has a configuration in which a nurse call master unit accommodates nurse call slave units allocated to respective patients (or bets) in patients rooms, nurses carry mobile terminals (personal handy-phone system (PHS) terminals, personal access system (PAS) terminals, or the like, hereinafter, referred to as PHS terminals) serving as extension terminals of the private branch exchange, and the mobile terminals are accommodated in the private branch exchange through a wireless line.

When a patient calls a nurse, the nurse call slave unit calls an extension number of the PHS terminal, and the nurse call master unit calls the PHS terminal through the private branch exchange, and the patient can talk with the nurse. Further, in an opposite way, the nurse can call the nurse call slave unit of the patient and can talk with the patient. Further, from a viewpoint of team nursing, the nurse call system is a system that can call the PHS terminals of a plurality of nurses belonging to one team so as to call the nurses in one floor who are in charge of the patient.

An example of such a nurse call system is illustrated in FIG. 6. The nurse call system includes a nurse call controller 20 that accommodates a plurality of nurse call slave units 10 (a slave unit 1, a slave unit 2, a slave unit 3, and a slave unit 4, . . . ), a private branch exchange (PBX) 40 that accommodates a plurality of PHS terminals 50 (a PHS 51-1, a PHS 51-2, a PHS 51-3, and a PHS 51-4, . . . ) through a wireless line, and a nurse call adaptor 32 lying between the nurse call controller 20 and the private branch exchange 40 and which converts an interface between them. Here, the nurse call controller 20 represents a part of functions, the function concerning communication control of a nurse call master unit that accommodates the plurality of nurse call slave units 10, and configures a part of the nurse call master unit.

Connection from the nurse call controller 20 to the private branch exchange 40 through the nurse call adaptor 32 according to this configuration will be described. As illustrated in FIG. 7, the nurse call adaptor 32 realizes the connection by connecting the nurse call controller 20 to an analog line unit 43 accommodated in the private branch exchange 40. The nurse call adaptor 32 relays two lines four speech paths (channels) included in the nurse call controller 20 to eight lines eight speech paths furnished by the analog line unit 43. That is, the nurse call adaptor 32 converts four data channels (B channels) of 2(2B+D) of ISDN basic interfaces of the nurse call controller 20 into analog lines, and connects the analog lines to the analog line unit 43 of the private branch exchange 40.

Accordingly, as illustrated in FIG. 7, a channel 1 of the nurse call controller 20 is converted into the analog line in the nurse call adaptor 32 and is accommodated in a channel 1 of the analog line unit 43 of the private branch exchange 40, and the channel 1 is connected to a channel 1 of the private branch exchange 40. Therefore, the PHS terminal 50 corresponding to an extension telephone of the private branch exchange 40 and the nurse call slave unit 10 can be connected through the channel 1.

CITATION LIST

Non Patent Literature

{NPL 1}
Guideline regarding connection between nurse call and housing complex intercom, and PBX 2002.09.25

SUMMARY OF INVENTION

Technical Problem

However, the nurse call adaptor is configured as a nurse call system dedicated device and is expensive, and its introduction is difficult. Therefore, an alternative to the nurse call adaptor has been desired. Further, a technology that enables connection between the nurse call controller and the private branch exchange without changing central control devices (CPUs) of the nurse call controller and the private branch exchange and without substantially changing software has been sought.

An objective of the present invention is to provide a nurse call system and a private branch exchange that enable connection with a nurse call controller without using a nurse call adaptor and without changing a conventional nurse call controller, and a control circuit and software of the private branch exchange.

Solution to Problem

In order to solve the problem, a first aspect of the present invention is a nurse call system for forming a speech path among a plurality of slave units and a plurality of extension terminals to conduct a call, including: a nurse call controller accommodating a plurality of slave units; a private branch exchange accommodating a plurality of extension terminals; and an interface unit provided between the nurse call controller and the private branch exchange, connected with the nurse call controller through a plurality of ISDN basic interfaces, and connected with the private branch exchange through an ISDN primary rate interface.

Another aspect of the present invention is an interface unit, which is configured to be used in a nurse call system for forming a speech path among a plurality of slave units and a plurality of extension terminals to conduct a call, including a nurse call controller accommodating a plurality of slave units and a private branch exchange accommodating a plurality of extension terminals, and provided between the nurse call controller and the private branch exchange, connected with the nurse call controller through a plurality of ISDN basic interfaces, and connected with the private branch exchange through an ISDN primary rate interface.

Another aspect of the present invention is a nurse call connection method of a nurse call system including a nurse call controller accommodating a plurality of slave units and a private branch exchange accommodating a plurality of extension terminals, for forming a speech path among the plurality of slave units and the plurality of extension terminals to conduct a call, the method including: providing, between the nurse call controller and the private branch exchange, an interface unit that performs interface conversion; and connecting, by the interface unit, the nurse call controller and the interface unit through a plurality of ISDN basic interfaces, and the private branch exchange and the interface unit through an ISDN primary rate interface.

Advantageous Effects of Invention

According to the present invention, the nurse call controller and the private branch exchange are connected through an ISDN basic interface and an ISDN primary rate interface, and therefore the connection can be made without changing hardware and software.

BRIEF DESCRIPTION OF DRAWINGS

FIG. 3 is a diagram for describing channel allocation of the nurse call dedicated unit of the embodiment of the present invention.

DESCRIPTION OF EMBODIMENTS

Hereinafter, an embodiment of the present invention will be described with reference to the drawings.

Figure 1:
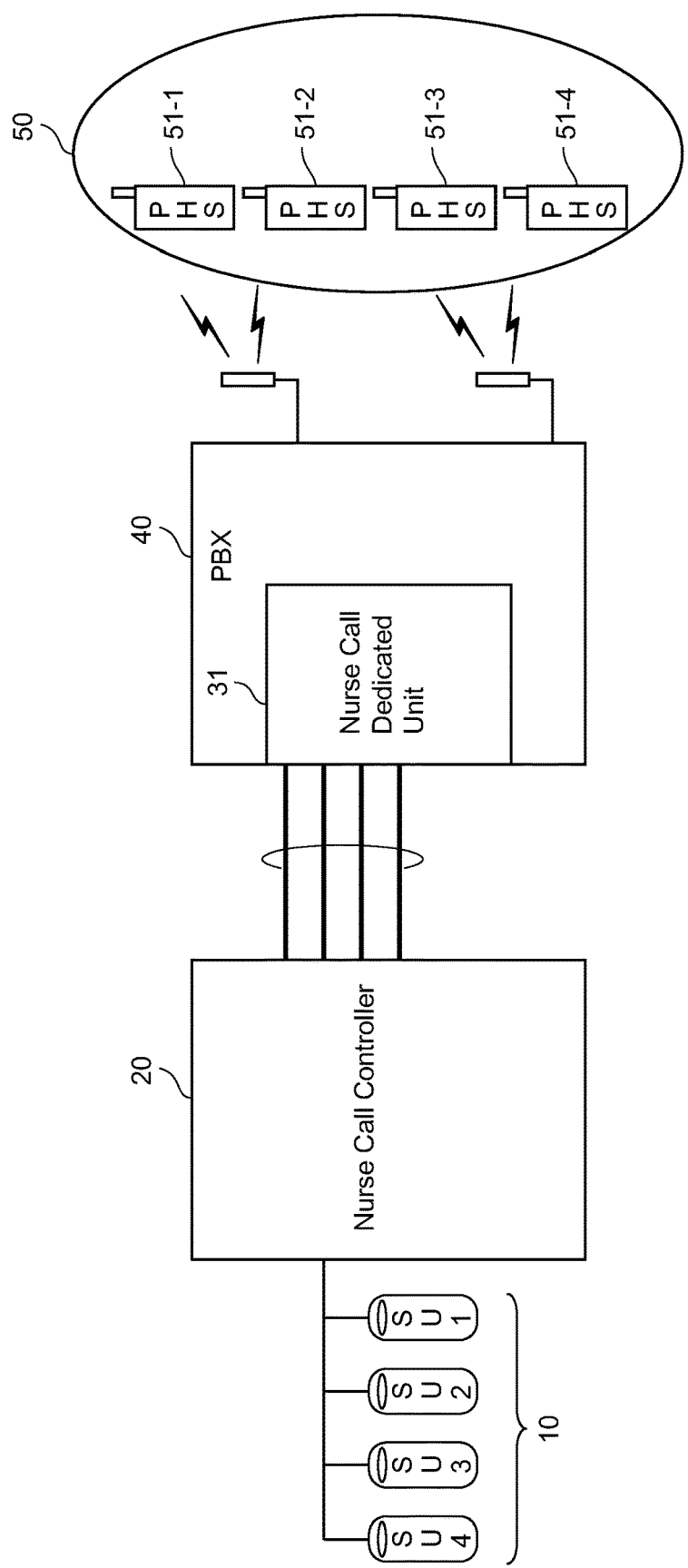
FIG. 1 is a diagram illustrating a configuration of an embodiment of the present invention.

FIG. 1 is a diagram illustrating an overall configuration of a nurse call system according to the present embodiment. The nurse call system of the present embodiment includes a nurse call controller 20 that accommodates a plurality of nurse call slave units 10 (a slave unit 1, a slave unit 2, a slave unit 3, and a slave unit 4, . . . ), a private branch exchange (PBX) 40, a plurality of PHS terminals 50 (a PHS 51-1, a PHS 51-2, a PHS 51-3, and a PHS 51-4, . . . ) that are extension terminals of the private branch exchange 40, are accommodated in the private branch exchange 40, and are carried by nurses (caregivers, or the like), and a nurse call dedicated unit 31 between the nurse call controller 20 and the private branch exchange 40, as means to convert an interface.

The nurse call slave unit 10 is installed for each patient (or in each bed) and has various buttons and call functions, and can call a nurse center or a nurse by an operation of the buttons or the like. The nurse call controller 20 represents a portion concerning control of communication and the like, of a nurse call master unit that accommodates the nurse call slave units, as described above, and has control functions such as call control of a nurse call and communication control.

The private branch exchange 40 is configured to have an exchange function between extensions, and between an extension and an outside line, and functions as a key telephone main device. Further, the private branch exchange 40 accommodates the plurality of PHS terminals 50 as mobile terminals through a wireless line, and performs exchange control of communication to the PHS terminals 50. Further, the private branch exchange 40 is connected with the nurse call controller 20, and performs control of a call of the PHS terminal 50 by a nurse call, a call of the nurse call slave unit 10 from the PHS terminal 50, and the like.

The nurse call dedicated unit 31 lies between the nurse call controller 20 and the private branch exchange 40, and performs interface conversion. That is, an interface of the nurse call dedicated unit 31 serves as an ISDN basic interface for the nurse call controller 20, and serves as an ISDN primary rate interface for the private branch exchange 40. Note that, in FIG. 1, the nurse call dedicated unit 31 is provided in the private branch exchange 40. However, the place of installation is not limited as long as the nurse call dedicated unit 31 has the function to convert an interface between the nurse call controller 20 and the private branch exchange 40.

Note that the private branch exchange 40 can be connected with a plurality of the nurse call controllers 20. However, FIG. 1 illustrates an example in which the private branch exchange 40 is connected with one nurse call controller 20, for description. Further, the number of the nurse call slave units 10 accommodated in one nurse call controller 20 (nurse call master unit) and the number of the PHS terminals 50 accommodated in the private branch exchange 40 are determined according to the specification of the nurse call system, and the numbers are not limited.

Next, interfaces and a nurse call connection method using the nurse call dedicated unit 31 will be described with reference to FIGS. 2 to 5.

Figure 2:
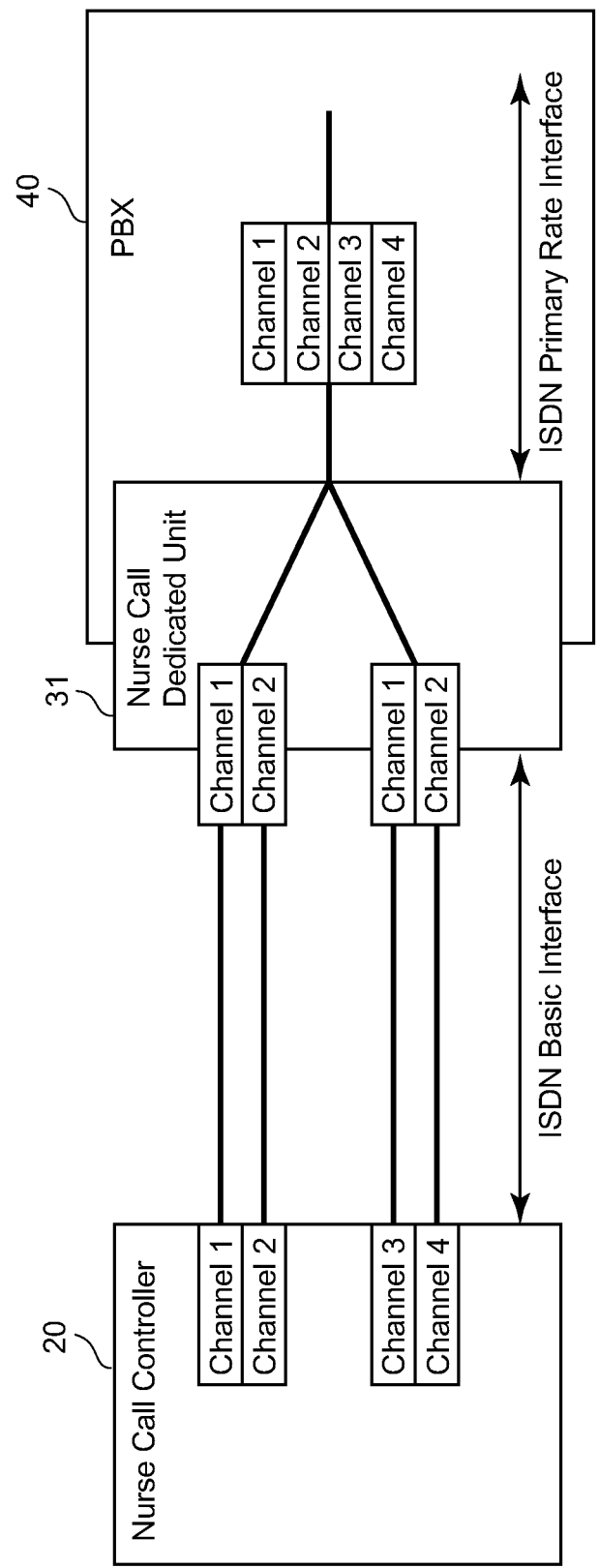
FIG. 2 is a diagram for describing nurse call connection using a nurse call dedicated unit of the embodiment of the present invention.

FIG. 2 illustrates an example in which the interface between the nurse call controller 20 and the nurse call dedicated unit 31 is the ISDN basic interfaces of 2(2B+D), and the interface between the nurse call dedicated unit 31 and the private branch exchange 40 is the ISDN primary rate interface of 23B+D.

The table of FIG. 3 illustrates channel allocation in the nurse call dedicated unit 31. In the ISDN basic interface on the nurse call controller 20 side, channels 1 and 2 are allocated to a circuit 1 (the ISDN basic interface circuit), and these channels correspond to channels 1 and 2 of the primary rate interface of 23B+D. Further, channels 1 and 2 are allocated to a circuit 2 (the ISDN basic interface circuit) on the nurse call controller 20 side, and these channels are allocated corresponding to channels 3 and 4 of the primary rate interface of 23B+D.

In the specification described in Guideline regarding connection between nurse call and housing complex intercom, and PBX, the number of channels included in the nurse call controller 20 is four, and thus in the nurse call dedicated unit 31, two channels are allocated to each of the circuit 1 and the circuit 2. Therefore, the interface of the nurse call dedicated unit 31 becomes an interface similar to the ISDN basic interfaces of 2(2B+D). However, in a case where the nurse call controller 20 accommodates both of the circuit 1 and the circuit 2 as the interface in being connected with the private branch exchange 40, a control channel (D channel) in the circuit 2 cannot be used according to the specification, and thus the D channel of the circuit 2 cannot be shared by the private branch exchange 40 side. Therefore, on the private branch exchange 40 side, the interface becomes an interface in which the nurse call dedicated unit 31 behaves as if it is the ISDN primary rate interface for the private branch exchange 40 side, in order to control four data channels (B channels) with one control channel (D channel).

While the ISDN primary rate interface of 23B+D is configured from twenty three data channels and one control channel, the nurse call dedicated unit 31 uses only four channels. Therefore, top four data channels of the ISDN primary rate interface of 23B+D on the private branch exchange 40 side are allocated to the four channels of the circuits 1 and 2 of the nurse call dedicated unit 31. Then, control is performed such that the channel 1 and the channel 2, of the four channels of the ISDN primary rate interface on the private branch exchange 40 side, are allocated to the channel 1 and the channel 2 used in the circuit 1 of the nurse call dedicated unit 31, and the channel 3 and the channel 4 of the ISDN primary rate interface on the private branch exchange 40 side are allocated to the channel 1 and the channel 2 used in the circuit 2 of the nurse call dedicated unit 31. In this case, a control line uses the circuit 1.

Figure 4:
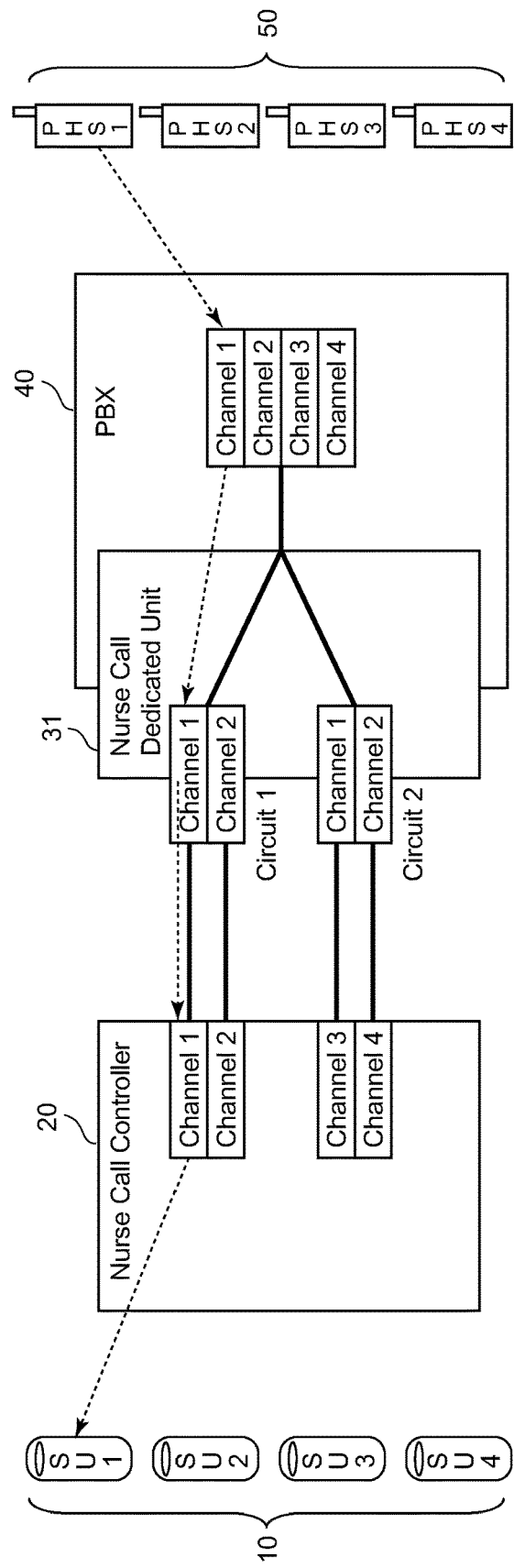
FIG. 4 is a diagram for describing connection of the embodiment of the present invention.

Next, a connection example of when the slave unit 1 of the nurse call slave units 10 is called from one PHS 1 of the PHS terminals 50 in FIG. 4 will be described.

This example is an example in which an ISDN line unit accommodated in the private branch exchange 40 is operated as the nurse call dedicated unit 31. The nurse call dedicated unit 31 is physically connected with the nurse call controller 20 as two lines four speech paths. Assume that four PHS terminals 50 (a PHS 1 to a PHS 4) are accommodated in the private branch exchange 40 in a communicative manner. Assume that four nurse call slave units 10 (a slave unit 1 to a slave unit 4) are accommodated in the nurse call controller 20. Then, the nurse call slave unit 10 and the PHS terminal 50 can call each other.

Here, channel selection in calling the slave unit 1 from the PHS 1 is performed such that the channel 1 of the ISDN primary rate interface of 23B+D furnished by the private branch exchange 40 and the channel 1 of the circuit 1 of the nurse call dedicated unit 31 are associated with each other, and the channel is specified. The nurse call dedicated unit 31 calls the slave unit 1, using the channel 1 of the nurse call controller 20 physically connected with the channel 1 of the circuit 1. If the slave unit 1 responds to the call, the speech path between the PHS 1 and the slave unit 1 is formed and communication becomes available.

Figure 5:
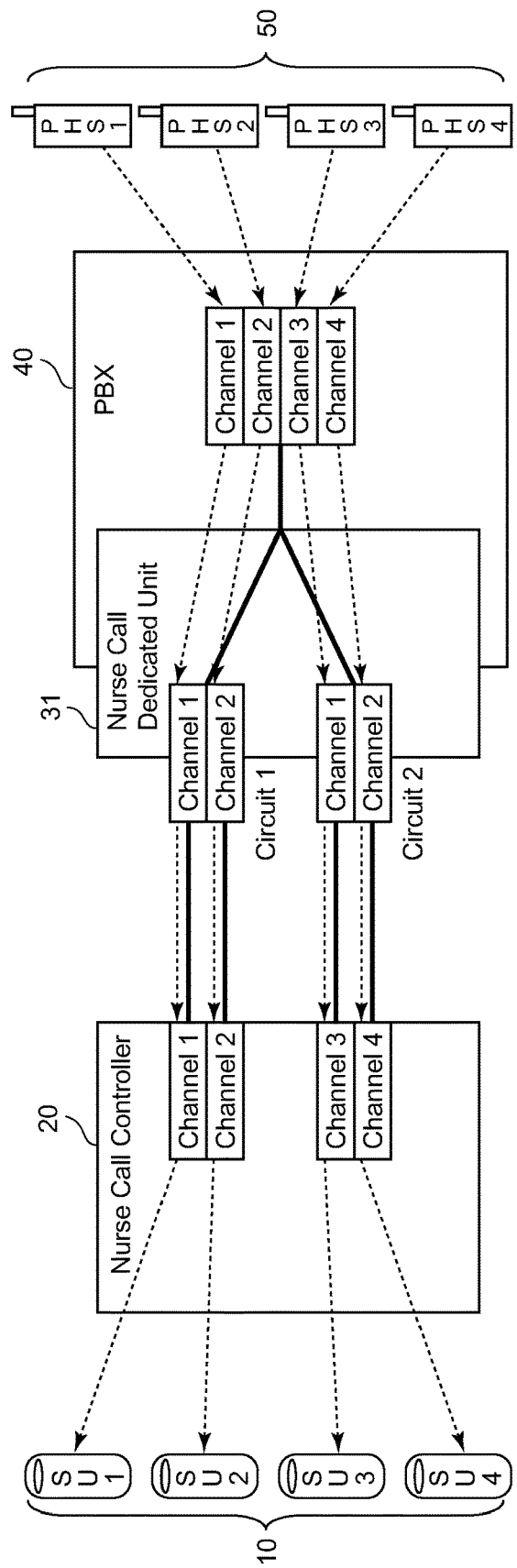
FIG. 5 is a diagram for describing connection used by all of channels of the embodiment of the present invention.
Figure 6:
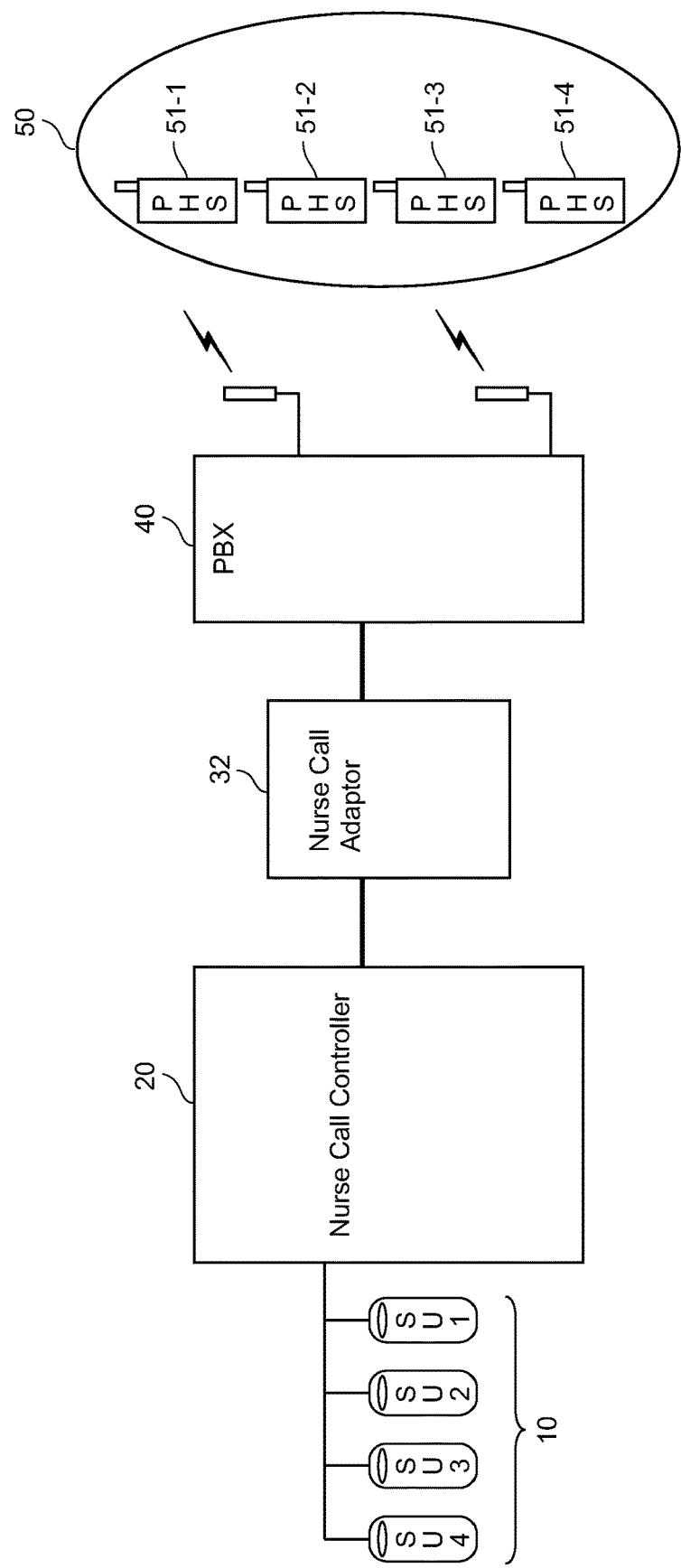
FIG. 6 is a diagram illustrating a nurse call system using a conventional nurse call adaptor.
Figure 7:
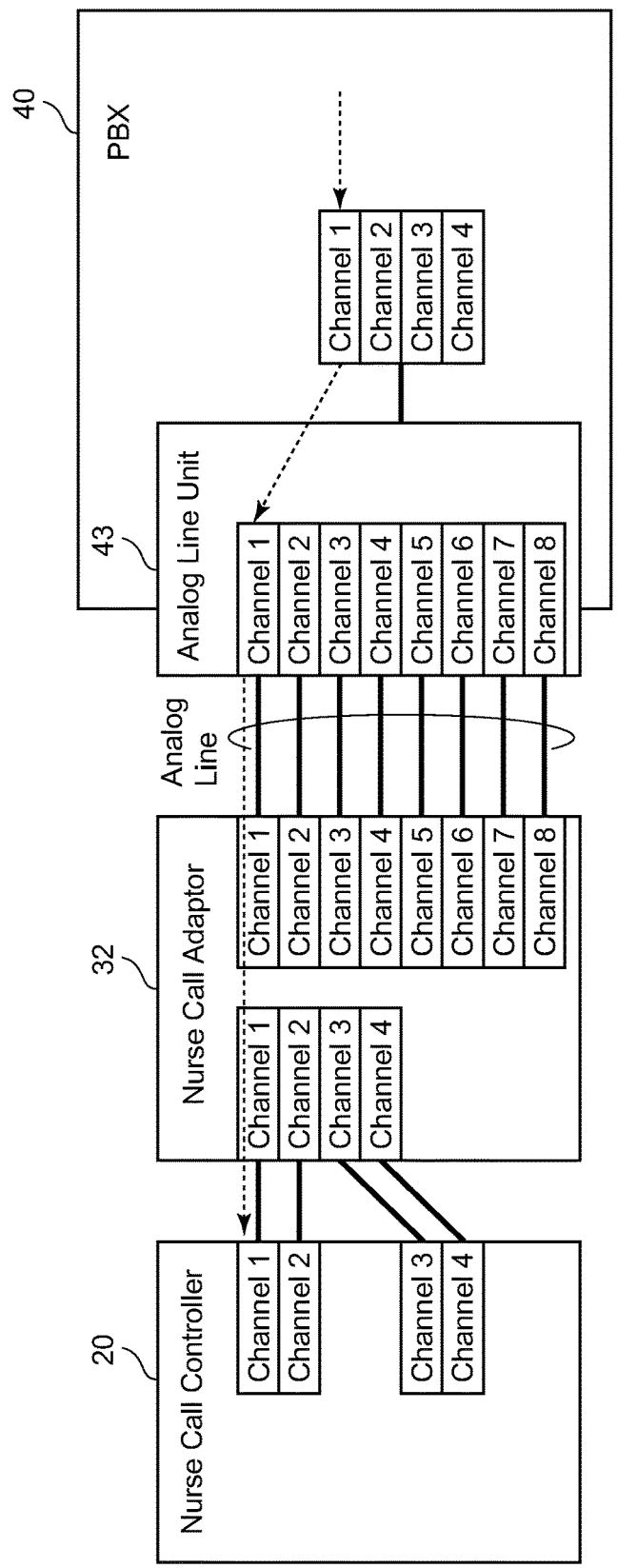
FIG. 7 is a diagram for describing connection using a conventional nurse call adaptor.

If a similar operation is performed from the PHS 1 to the PHS 4, the nurse call slave units 10 and the PHS terminals 50 can perform communication, using up to four channels at the same time. FIG. 5 illustrates an example in which the communication is performed using all of the four channels.

As described above, the nurse call dedicated unit 31 functions as the ISDN basic interface for the nurse call controller 20, and functions as the ISDN primary rate interface for the private branch exchange 40. Therefore, communication control between the nurse call slave units and the PHS terminals serving as the extension terminals of the private branch exchange can be performed using the ISDN interface function of the conventional private branch exchange, and cost of update of hardware, change of software, and the like can be reduced.

As the nurse call dedicated unit 31, an INS line unit of the private branch exchange 40 is used, and the ISDN basic interface is converted into the ISDN primary rate interface in the private branch exchange 40, so that the hardware of the device is not changed and also the change of software can be reduced. In this case, the INS line unit of the private branch exchange can be realized as software that executes a function as a nurse call dedicated unit that performs interface exchange between the ISDN basic interface of the nurse call dedicated unit and the ISDN primary rate interface. Further, a configuration to separately provide the nurse call dedicated unit 31 from the private branch exchange 40, and accommodate the nurse call dedicated unit 31 in a line unit of the ISDN primary rate interface of the private branch exchange 40 can be realized.

Further, in the above description of the embodiment, an example in which the nurse call dedicated unit 31 accommodates two ISDN basic interfaces of 2(2B+D) has been described. However, the number of the data channels of the ISDN primary rate interface is twenty three, and thus the nurse call dedicated unit 31 can accommodate up to eleven ISDN basic interfaces.

The invention claimed is:

1. A nurse call system for forming a speech path among a plurality of slave units and a plurality of extension terminals to conduct a call, comprising:
   a nurse call controller accommodating the plurality of slave units;
   a private branch exchange accommodating the plurality of extension terminals; and
   an interface unit provided between the nurse call controller and the private branch exchange, connected with the nurse call controller through N (N is a natural number greater than or equal to 2) number of ISDN (Integrated Services Digital Network) basic interfaces, connected with the private branch exchange through an ISDN primary rate interface, to interface between the ISDN primary rate interface controlling a plurality of data channels with one control channel and the N number of ISDN basic interfaces that functions as an interface controlling all of 2N data channels with one control channel, by controlling all of the 2N data channels of the N number of ISDN basic interfaces with the one control channel of the ISDN primary rate interface and the one control channel of one ISDN basic interface in the N number of ISDN basic interfaces, and allocating the 2N data channels of the N number of ISDN basic interfaces on the nurse call controller side to data channels of the ISDN primary rate interface on the private branch exchange side in order from a first data channel.

2. The nurse call system according to claim 1, wherein the interface unit is accommodated in the private branch exchange.

3. An interface unit, which is:
   configured to be used in a nurse call system for forming a speech path among a plurality of slave units and a plurality of extension terminals to conduct a call, comprising a nurse call controller accommodating the plurality of slave units, and a private branch exchange accommodating the plurality of extension terminals; and
   provided between the nurse call controller and the private branch exchange, connected with the nurse call controller through N (N is a natural number greater than or equal to 2) number of ISDN (Integrated Services Digital Network) basic interfaces, and connected with the private branch exchange through an ISDN primary rate interface, to interface between the ISDN primary rate interface controlling a plurality of data channels with one control channel and the N number of ISDN basic interfaces that functions as an interface controlling all of 2N data channels with one control channel, by controlling all of the 2N data channels of the N number of ISDN basic interfaces with the one control channel of the ISDN primary rate interface and the one control channel of one ISDN basic interface in the N number of ISDN basic interfaces and allocating the 2N data channels of the N number of ISDN basic interfaces on the nurse call controller side to data channels of the ISDN primary rate interface on the private branch exchange side in order from a first data channel.

4. A nurse call connection method of a nurse call system including a nurse call controller accommodating a plurality of slave units, and a private branch exchange accommodating a plurality of extension terminals, for forming a speech path among the plurality of slave units and the plurality of extension terminals to conduct a call, the method comprising:

providing, between the nurse call controller and the private branch exchange, an interface unit that performs interface conversion;

connecting, by the interface unit, the nurse call controller and the interface unit through N (N is a natural number greater than or equal to 2) number of ISDN (Integrated Services Digital Network) basic interfaces, and the private branch exchange and the interface unit through an ISDN primary rate interface;

interfacing between the ISDN primary rate interface controlling a plurality of data channels with one control channel and the N number of ISDN basic interfaces that functions as an interface controlling all of 2N data channels with one control channel, by controlling, by the interface unit, all of the 2N data channels of the N number of ISDN basic interfaces with the one control channel of the ISDN primary rate interface and one control channel of one ISDN basic interface in the N number of ISDN basic interfaces; and allocating, by the interface unit, the 2N data channels of the N number of ISDN basic interfaces on the nurse call controller side to data channels of the ISDN primary rate interface on the private branch exchange side in order from a first data channel.

* * * * *